(12) United States Patent
Kawabata et al.

(10) Patent No.: US 10,575,473 B2
(45) Date of Patent: Mar. 3, 2020

(54) GREENHOUSE FOR PLANT CULTIVATION

(71) Applicants: The University of Tokyo, Tokyo (JP); Plants Laboratory Inc., Tokyo (JP)

(72) Inventors: Saneyuki Kawabata, Tokyo (JP); Atsuyuki Yukawa, Tokyo (JP); Shinji Shimizu, Tokyo (JP)

(73) Assignees: The University of Tokyo, Tokyo (JP); Plants Laboratory Inc., Tokyo (JP)

( * ) Notice: Subject to any disclaimer, the term of this patent is extended or adjusted under 35 U.S.C. 154(b) by 222 days.

(21) Appl. No.: 15/755,445

(22) PCT Filed: Aug. 5, 2016

(86) PCT No.: PCT/JP2016/073078
§ 371 (c)(1),
(2) Date: Feb. 26, 2018

(87) PCT Pub. No.: WO2017/033706
PCT Pub. Date: Mar. 2, 2017

(65) Prior Publication Data
US 2018/0242535 A1    Aug. 30, 2018

(30) Foreign Application Priority Data

Aug. 27, 2015 (JP) .................................. 2015-168041

(51) Int. Cl.
*A01G 9/14* (2006.01)
*A01G 9/24* (2006.01)
*D06M 11/83* (2006.01)

(52) U.S. Cl.
CPC ......... *A01G 9/1438* (2013.01); *A01G 9/1415* (2013.01); *A01G 9/246* (2013.01);
(Continued)

(58) Field of Classification Search
CPC .. A01G 9/1438; A01G 9/1469; A01G 9/1415; A01G 9/14
See application file for complete search history.

(56) References Cited

U.S. PATENT DOCUMENTS 4,244,145 A * 1/1981 Polacsek .................. A01G 9/14
47/17
4,274,234 A * 6/1981 Abell .................... A01G 9/1415
52/63
(Continued)

FOREIGN PATENT DOCUMENTS

CA   1148741 A   6/1983
DE   3244428 A1  6/1984
(Continued)

OTHER PUBLICATIONS

Extended European Search Report for European Application No. 16839053.2 dated Aug. 28, 2018, 5 pages.
(Continued)

*Primary Examiner* — Monica L Williams
(74) *Attorney, Agent, or Firm* — Bret E. Field; Bozicevic, Field & Francis LLP

(57) ABSTRACT

A greenhouse framework (22) is assembled out of a framework material (24) such as typical pipes and the like, and the outer periphery of the greenhouse framework (22) is covered by a sheet outer surface member (30) formed from a plastic sheet; a sheet inner surface member (32) is formed on the inner side of the greenhouse framework (22) in a manner of being spaced by intervals to a certain extent from the sheet outer surface member (30) by using a heat shield sheet such that all of a floor surface (32a), a wall surface (32b), and a ceiling surface (32c) are substantially in a sealed state; and an air conditioning device (40) is installed. Thus, a desirable thermal insulation property is achieved between the inside of the greenhouse and the outside of the greenhouse, and air
(Continued)

conditioning can be implemented with high energy efficiency. In other words, a greenhouse for plant cultivation that has a simple configuration and can be air conditioned with high energy efficiency can be provided.

7 Claims, 2 Drawing Sheets

(52) U.S. Cl.
CPC ..... D06M 11/83 (2013.01); *A01G 2009/1453* (2013.01); *Y02A 40/252* (2018.01); *Y02A 40/268* (2018.01); *Y02P 60/147* (2015.11)

(56) References Cited

U.S. PATENT DOCUMENTS

| | | | | |
|---|---|---|---|---|
| 4,313,420 | A * | 2/1982 | Poeschl | A01G 9/1415 126/631 |
| 4,316,450 | A * | 2/1982 | Somos | A01G 9/24 126/668 |
| 4,399,671 | A * | 8/1983 | Henningsson | A01G 9/1438 66/196 |
| 5,596,843 | A * | 1/1997 | Watson | A01G 9/1415 52/71 |
| 5,815,991 | A * | 10/1998 | de Ridder | A01G 9/1407 52/86 |
| 9,783,983 | B1 * | 10/2017 | Fairbanks | E04B 7/102 |
| 2012/0198766 | A1 * | 8/2012 | DeBolt | A01G 9/14 47/66.7 |
| 2015/0239218 | A1 * | 8/2015 | Lempidakis | B32B 7/06 47/17 |

FOREIGN PATENT DOCUMENTS

| | | |
|---|---|---|
| EP | 1872652 A1 | 1/2008 |
| JP | S5793137 A | 6/1982 |
| JP | S57136736 U | 8/1982 |
| JP | S637525 U | 1/1988 |
| JP | 2007-20492 A | 2/2007 |
| JP | 2007020492 A | 2/2007 |
| JP | 2010-17170 A | 1/2010 |
| JP | 2010017170 A | 1/2010 |
| JP | 5595452 B2 | 9/2014 |
| KR | 20-0166816 Y1 | 2/2000 |

OTHER PUBLICATIONS

Examination Report No. 1 for Australian Application No. 2016311765 dated Nov. 15, 2018, 4 pages.

* cited by examiner

GREENHOUSE FOR PLANT CULTIVATION

TECHNICAL FIELD

The present invention relates to a greenhouse for plant cultivation, specifically to a greenhouse for plant cultivation formed by covering the outer periphery of a greenhouse framework with a sheet such as a plastic sheet.

BACKGROUND

Conventionally, for such greenhouse for plant cultivation, a solution in which a ceiling portion and a wall portion are formed from thermal insulation plates has been proposed (e.g., referring to Patent Document 1). The thermal insulation plate forming the ceiling portion is formed by pasting aluminum foil on both sides of a foaming plate having a thickness of approximately 10 cm, and the thermal insulation plate forming the wall portion is formed by pasting aluminum foil on the inner side of the greenhouse of a foaming plate having a thickness of approximately 20 cm.

PRIOR ART DOCUMENT

[Patent Document]
Patent Document 1: Japanese Patent No. 5595452

SUMMARY

However, in the above greenhouse for plant cultivation, a floor portion is a ground surface, through which heat may flow into and out of the greenhouse, resulting in that the thermal insulation effect of the greenhouse degrades, and air conditioning in the greenhouse requires relatively high power consumption. In addition, because relatively thick and heavy thermal insulation plates are used for the wall portion and the ceiling portion, the necessity of forming the ceiling portion or the wall portion for installing the thermal insulation plates is increased, and the weights and sizes are also increased.

The main objective of the present invention is to provide a greenhouse for plant cultivation that has a simple configuration and can be air conditioned with high energy efficiency.

To achieve the above main objective, the greenhouse for plant cultivation according to the present invention adopts the following solution.

The greenhouse for plant cultivation according to the present invention is a greenhouse for plant cultivation including a greenhouse framework assembled out of a framework material such as pipes and a sheet outer surface member formed from a sheet such as a plastic sheet and sheltered in a manner of covering the outer periphery of the greenhouse framework, characterized as including: a sheet inner surface member forming all of a floor surface, a wall surface, and a ceiling surface in a sealed state on the inner side of the sheet outer surface member in a manner of being spaced by intervals from the sheet outer surface member by using a flexibly bendable heat shield sheet formed by coating both sides of a sheet-shaped material with metal foil; and an air conditioning device for air conditioning the inner side of the sheet inner surface member.

The greenhouse for plant cultivation according to the present invention is configured such that a greenhouse framework is assembled out of a framework material such as pipes, and a sheet outer surface member is formed from a sheet such as a plastic sheet and sheltered in a manner of covering the outer periphery of the greenhouse framework. Moreover, by using a flexibly bendable heat shield sheet formed by coating both sides of a sheet-shaped material with metal foil, a sheet inner surface member is formed on the inner side of the sheet outer surface member in a manner of being spaced by intervals from the sheet outer surface member, such that all of a floor surface, a wall surface, and a ceiling surface are in a sealed state. Herein, the "sealed state" not only means a completely sealed state, but also includes a state in which there exist several gaps such as a gap for installing the air conditioning device, a gap for ventilation, and a gap of a door at entrance/exit for a person or equipment, and so on. Thus, with the dual configuration of the sheet outer surface member and the sheet inner surface member, thermal insulation can be effectively implemented between the inside of the greenhouse and the outside of the greenhouse. Moreover, as the heat shield sheet is used for the sheet inner surface member, thermal insulation can be implemented more effectively between the inside of the greenhouse and the outside of the greenhouse. As a result, power consumption required by air conditioning the inner side of the sheet inner surface member (i.e., the inside of the greenhouse) can be reduced. In addition, as the flexibly bendable heat shield sheet formed by coating both sides of the sheet-shaped material with metal foil is used for the sheet inner surface member, a floor portion, a wall portion, and a ceiling portion do not need to be formed from plates. Therefore, the greenhouse may be lightweight. Herein, the "heat shield sheet" may be configured in a state in which both sides of glass cloth are coated with aluminum foil. In this case, the heat shield sheet preferably has a thickness of 0.3 mm or less.

In the above greenhouse for plant cultivation according to the present invention, as for the sheet inner surface member, the floor surface is configured in a state in which a floor portion formed from wood and the like is installed with the heat shield sheet, and the wall surface and the ceiling surface are configured in a state in which a base installed to the greenhouse framework by using wood and the like is installed with the heat shield sheet thereon. Thus, such solution may not only make thermal insulation on the floor portion more effectively, but also configure the wall surface and the ceiling surface easily.

DETAILED DESCRIPTION

Figure 1:
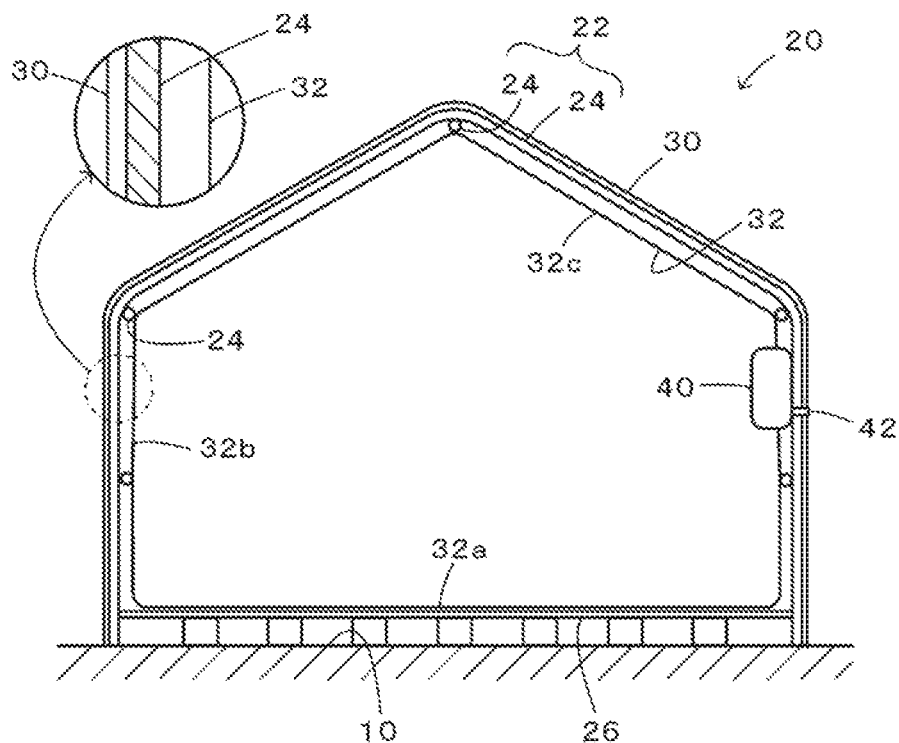
FIG. 1 is an explanatory drawing illustrating an outline of a structure of a greenhouse 20 for plant cultivation according to an embodiment of the present invention.

Next, forms for implementing the present invention are described as follows. FIG. 1 is an explanatory drawing illustrating an outline of a structure of a greenhouse 20 for plant cultivation according to an embodiment of the present invention, FIG. 2 is an appearance structural diagram illustrating an example of a greenhouse framework 22 as a framework structure of the greenhouse 20 for plant cultivation according to the embodiment, and FIG. 3 is an explanatory drawing schematically illustrating an example of a sectional structure of a heat shield sheet.

Figure 2:
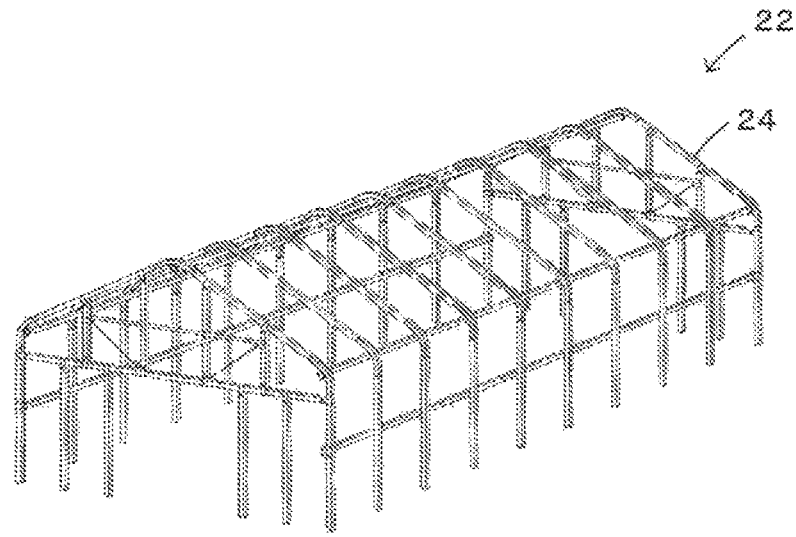
FIG. 2 is an appearance structural diagram illustrating an example of a greenhouse framework 22 of the greenhouse 20 for plant cultivation according to the embodiment.

As shown in FIGS. 1 and 2, the greenhouse 20 for plant cultivation according to the embodiment includes: a greenhouse framework 22 assembled out of a framework material 24 such as pipes or angles formed from metal (e.g., stainless steel or iron and the like), and fastened to a ground surface 10; a sheet outer surface member 30 configured such that the outer periphery of the greenhouse framework 22 is covered by a plastic sheet; a sheet inner surface member 32 forming all of a floor surface 32a, a wall surface 32b, and a ceiling surface 32c in a sealed state on the inner side of the greenhouse framework 22 in a manner of being spaced by intervals to a certain extent (1 cm or more) from the sheet outer surface member 30 by using a heat shield sheet; an air conditioning device 40 for air conditioning the inner side of the sheet inner surface member 32; and a door (not shown) at entrance/exit for a person, and equipment and the like necessary for plant cultivation.

For the framework material 24, metal pipes or bars used for a typical plastic greenhouse may be used, and pipes for assembling a scaffold used at a construction site and the like may also be used. For the plastic sheet, a plastic sheet used for a typical plastic greenhouse may be used, and various water-impermeable sheets may also be used.

Figure 3:
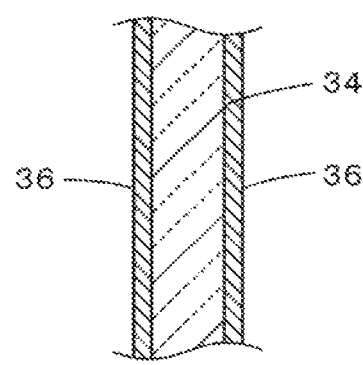
FIG. 3 is an explanatory drawing schematically illustrating an example of a sectional structure of a heat shield sheet.

For the heat shield sheet, as shown in FIG. 3, the following material may be used: a flexibly bendable sheet-shaped material formed by coating both sides of various sheet-shaped materials 34 that serving as a core material, such as glass cloth, with metal foil (e.g., aluminum foil) 36, and further coating the surface with an anti-electrolytic corrosion coating.

In the embodiment illustrated in FIG. 1, the floor surface 32a is configured in a manner in which a floor portion 26 is formed using a typical configuration of floor portion with respect to the ground surface, and an upper surface of the floor portion 26 is covered by the heat shield sheet. The wall surfaces 32b around are configured in a manner in which a base (not shown) formed from studs or filler strips and the like is installed by using wood and the like with respect to the framework material 24, and the heat shield sheet is installed to the base. Identical to the wall surface 32b, the ceiling surface 32c is configured in a manner in which a base (not shown) is installed by using wood and the like with respect to the framework material 24, and the heat shield sheet is installed to the base.

In the embodiment, the air conditioning device 40 may be a typical household air conditioner with an indoor machine and an outdoor machine. Accordingly, the greenhouse 20 for plant cultivation is provided with a pipe through hole 42 for making a pipe (not shown) provided for a refrigerant cycling between the indoor machine and the outdoor machine penetrated therethrough.

The sheet inner surface member 32 configures all of the floor surface 32a, the wall surface 32b, and the ceiling surface 32c in a sealed state. As described from the above, because the greenhouse 20 for plant cultivation according to the embodiment is installed with the air conditioning device 40, and further installed with the door at entrance/exit for a person and equipment for plant cultivation and the like, the sheet inner surface member 32 has a gap to a certain extent formed thereon, and is sealed to a certain extent but not completely sealed. In the specification, such state is referred to as a sealed state.

Next, an experimental example of the greenhouse 20 for plant cultivation according to the embodiment is described as follows. The greenhouse for plant cultivation in the experimental example is configured as follows: the greenhouse framework 22 is assembled such that a single-pipe material serving as a common construction component with a diameter of 48.6 mm and a thickness of 2.4 mm is used for the framework material 24, the greenhouse framework 24 having a ridge with a height of 3,400 mm, an eave with a height of 2,500 mm, pillars with intervals ranged from 1,820 mm to 2,000 mm, and a floor surface area as 8 m×14.56 m. The sheet outer surface member 30 is configured by covering the greenhouse framework 22 with a plastic sheet of white vinyl (white-white COAT produced by CI Chemistry) having a thickness of 0.15 mm, which serves as a typical agricultural material. The sheet inner surface member 32 is configured by using a flexibly bendable heat shield sheet having a thickness of 0.2 mm and formed by coating both sides of glass cloth that serving as a core material, with aluminum foil and further coating the surface with an anti-electrolytic corrosion coating. The floor portion is configured at a position approximately 10 cm above the ground surface by using a plate serving as a typical construction component and having a width of 900 mm, a length of 1,800 mm, and a thickness of 15 mm, the heat shield sheet is installed onto an upper surface of the floor portion by using a tacker, and adjacent heat shield sheets are adhered together with an aluminum foil tape, thus the floor surface 32a of the sheet inner surface member 32 is formed. A wall portion base constituted by studs or filler strips and the like formed from wood is installed for the framework material 24 of the greenhouse framework 22, the heat shield sheet is installed to the wall portion base by using a tacker, and adjacent heat shield sheets are adhered together with an aluminum foil tape, thus the wall surface 32b of the sheet inner surface member 32 is formed. A ceiling portion base such as a beam and the like is configured by using wood in a manner in which the ceiling portion has a height of 2,250 mm, the heat shield sheet is installed to the ceiling portion base by using a tacker, and adjacent heat shield sheets are adhered together with an aluminum foil tape, thus the ceiling surface 32c of the sheet inner surface member 32 is formed. In addition, the aluminum foil tape is also used for engagement between the floor surface 32a and the wall surface 32b and engagement between the wall surface 32b and the ceiling surface 32c. Two typical household wall-mounted air conditioners (AN56SEP-W produced by Daikin Kogyo Co., Ltd. (standard: 18 tatami≈29 $m^2$)) may be installed as the air conditioning device 40. In addition, the greenhouse for plant cultivation in the experimental example is further provided with a humidity regulator (MP300 produced by Dyna Air Co., Ltd.). In addition, in a case where air conditioning is implemented on a common building having the same volume as the greenhouse for plant cultivation in the experimental example, despite further associated with the heat shield design of the common building, generally, multiple industrial air conditioners with larger outputs than the above typical household wall-mounted air conditioners are required.

The greenhouse for plant cultivation in the experimental example was built in the nursery field of Institute for Sustainable Agro-ecosystem Services affiliated with Tokyo University in June, 2015, and during the experiment run up to August 20 at the same year, the temperature inside the greenhouse was stably controlled at 24° C. to 26° C., and plants were cultivated well.

In the greenhouse 20 for plant cultivation according to the embodiment described from the above, the greenhouse framework 22 is assembled out of the framework material 24 such as typical pipes, the outer periphery of the greenhouse framework 22 is covered by the sheet outer surface member 30 formed from a plastic sheet, and the sheet inner surface member 32 is formed on the inner side of the greenhouse framework 22 in a manner of being spaced by intervals to a certain extent from the sheet outer surface member 30 by using the heat shield sheet, such that all of the floor surface 32a, the wall surface 32b, and the ceiling surface 32c are substantially in a sealed state. Thus, a desirable thermal insulation property is achieved between the inside of the greenhouse and the outside of the greenhouse, and air conditioning can be implemented with high energy efficiency. In other words, a greenhouse for plant cultivation that has a simple configuration and can be air conditioned with high energy efficiency can be provided. Moreover, a material formed by coating both sides of a sheet-shaped material with metal foil is used for the heat shield sheet, such that a more desirable thermal insulation property can be achieved between the inside of the greenhouse and the outside of the greenhouse. In addition, the floor portion is formed in a manner of being spaced by intervals to a certain extent from the ground surface, and the floor surface 32a is formed on the upper surface of the floor portion, thus a desirable property of thermal insulation from the ground surface can be achieved. In addition, with the dual configuration of the sheet outer surface member 30 and the sheet inner surface member 32, and the solution in which the sheet inner surface member 32 is configured such that all of the floor surface 32a, the wall surface 32b, and the ceiling surface 32c are substantially in a sealed state, a desirable insect prevention effect can be achieved.

Herein, in the experimental example, a single-pipe material serving as a common construction component with a diameter of 48.6 mm and a thickness of 2.4 mm is used for the framework material 24, and any pipe or bar and the like may also be used provided that the strength of a pipe framework formed therefrom can be ensured. In the experimental example, a plastic sheet of a white plastic (white-white COAT produced by CI Chemistry) with a thickness of 0.15 mm, which serves as a typical agricultural material, or a typical sheet for agricultural use or a typical sheet for industrial use may be used for the sheet outer surface member 30. In the experimental example, a flexibly bendable heat shield sheet having a thickness of 0.2 mm and formed by coating both sides of glass cloth that serving as a core material, with aluminum foil and further coating the surface with an anti-electrolytic corrosion coating is used for the sheet inner surface member 32, wherein the metal foil for coating is not limited to the aluminum foil, and may also be other metal foil; and the core material is not limited to the glass cloth, and may also be a sheet-shaped material such as a cloth material. In the experimental example, the floor surface 32a is formed by installing the heat shield sheet onto the upper surface of the floor portion configured at a position approximately 10 cm above the ground surface, and may also be formed by directly loading the heat shield sheet on the ground surface. In the experimental example, the wall surface 32b is formed by installing the wall portion base formed from wood to the framework material 24 of the greenhouse framework 22 and installing the heat shield sheet to the wall portion base, and may also be formed by installing the wall portion to the framework material 24 of the greenhouse framework 22 and installing the heat shield sheet to the wall portion, or formed by directly installing the heat shield sheet to the framework material 24 of the greenhouse framework 22.

In the experimental example, the ceiling surface 32c is formed by installing the ceiling portion base formed from wood to the framework material 24 of the greenhouse framework 22 and installing the heat shield sheet to the ceiling portion base, and may also be formed by installing the ceiling portion to the framework material 24 of the greenhouse framework 22 and installing the heat shield sheet to an lower surface of the ceiling portion, or formed by directly installing the heat shield sheet to the framework material 24 of the greenhouse framework 22. In the experimental example, two typical household wall-mounted air conditioners, or three more typical household air conditioners, or one or more industrial air conditioners may be used for the air conditioning device 40.

Although the manners for implementing the present invention are described by using embodiments as described from the above, the present invention is definitely not limited to those embodiments, and certainly, the present invention can be implemented in various manners without departing from the scope of the essence of the present invention.

INDUSTRIAL UTILIZATION POSSIBILITY

The present invention can be applied to the manufacturing industry and the like of greenhouses for plant cultivation.

The invention claimed is:
1. A greenhouse for plant cultivation, comprising a greenhouse framework assembled out of a framework material and a sheet outer surface member formed from a water-impermeable sheet and sheltered in a manner of covering the outer periphery of the greenhouse framework, wherein the greenhouse for plant cultivation comprises:
  a sheet inner surface member forming all of a floor surface, a wall surface, and a ceiling surface in a sealed state on the inner side of the sheet outer surface member in a manner of being spaced by intervals from the sheet outer surface member by using a flexibly bendable heat shield sheet formed by coating both sides of a sheet-shaped material with metal foil; and
  an air conditioning device for air conditioning the inner side of the sheet inner surface member.
2. The greenhouse for plant cultivation according to claim 1, wherein as for the sheet inner surface member, the floor surface is configured in a state in which a floor portion formed from wood and the like is installed with the heat shield sheet, and the wall surface and the ceiling surface are configured in a state in which the heat shield sheet is installed on a base formed from wood or the like installed to the greenhouse framework.
3. The greenhouse for plant cultivation according to claim 2, wherein the heat shield sheet is configured in a state in which both sides of a cloth material which is used as the sheet-shaped material are coated with aluminum foil.
4. The greenhouse for plant cultivation according to claim 3, wherein the cloth material is glass cloth.
5. The greenhouse for plant cultivation according to claim 1, wherein the heat shield sheet is configured in a state in which both sides of a cloth material which is used as the sheet-shaped material are coated with aluminum foil.
6. The greenhouse for plant cultivation according to claim 5, wherein the cloth material is glass cloth.
7. The greenhouse for plant cultivation according to claim 1, wherein the water-impermeable sheet is plastic sheet.

* * * * *